No. 659,270. Patented Oct. 9, 1900.
W. O. WEBBER.
HYDRAULIC AIR COMPRESSING APPARATUS.
(Application filed Jan. 30, 1900.)
(No Model.) 2 Sheets—Sheet 1.

Witnesses:
Walter E. Lombard.
Amy F. Williamson

Inventor:
William O Webber

No. 659,270. Patented Oct. 9, 1900.
W. O. WEBBER.
HYDRAULIC AIR COMPRESSING APPARATUS.
(Application filed Jan. 30, 1900.)
(No Model.) 2 Sheets—Sheet 2.

WITNESSES:
C. M. W. Smith.
Amy F. Williamson.

INVENTOR
William O. Webber

UNITED STATES PATENT OFFICE.

WILLIAM O. WEBBER, OF BROOKLINE, MASSACHUSETTS, ASSIGNOR TO WALTER C. CARR, OF NEW YORK, N. Y.

HYDRAULIC AIR-COMPRESSING APPARATUS.

SPECIFICATION forming part of Letters Patent No. 659,270, dated October 9, 1900.

Application filed January 30, 1900. Serial No. 3,327. (No model.)

*To all whom it may concern:*

Be it known that I, WILLIAM OLIVER WEBBER, of the town of Brookline, county of Norfolk, and State of Massachusetts, have invented certain new and useful Improvements in Hydraulic Air-Compressing Apparatus; and I hereby declare that the following is a clear, full, and exact description of the same.

This invention relates more particularly to air-compressing apparatus of the kind described in the Patents Nos. 543,410, 543,411, and 543,412, granted to Charles Havelock Taylor, of Montreal, Canada, assignor to the Taylor Hydraulic Air-Compressing Company, Limited, of the same place, and, while I do not claim the invention of a hydraulic air-compressing apparatus in its broad sense, I do desire to claim the specific details of construction which comprise the following improvements: first, the arrangement of air-outlet pipes vertically depending from an enlarged main air-inlet chamber and so arranged that they can be raised or lowered vertically, so as to vary the amount that the lower ends of the outlet-pipes shall project into the mouth of the water-inlet aperture; secondly, an inclosed and enlarged form of air-inlet chamber provided with smaller vertical upwardly-projecting air-inlet pipes extending above the surface of the water in the main inlet-head chamber, so that the enlarged main air-inlet chamber may be submerged below the surface of the water; thirdly, the arrangement of the main air-inlet chamber in relation to the inlet-headpiece, so that the water may have access to the water-inlet opening from both sides in order to increase the facility by which the water may enter this inlet and give the water greater and easier access through the depending air-outlet pipes, and, fourthly, the arrangement of the curved water-guides, through which the depending air-outlet pipes pass, so as to guide the water through the depending air-outlet pipes and increase the flow of water through the more centrally-situated pipes, and thus equalize the flow of water, all as hereinafter described and pointed out by the claims, reference being had to the annexed drawings, forming part of this specification, in which like symbols represent corresponding parts, and wherein—

Figure 1:
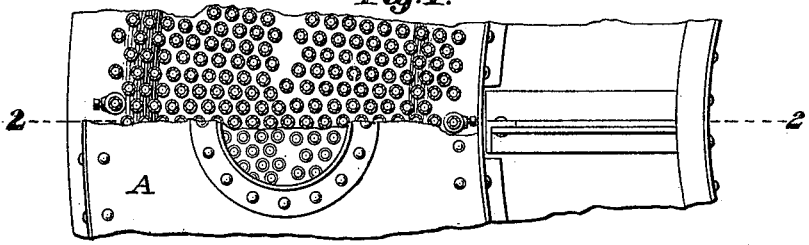
Figure 2:
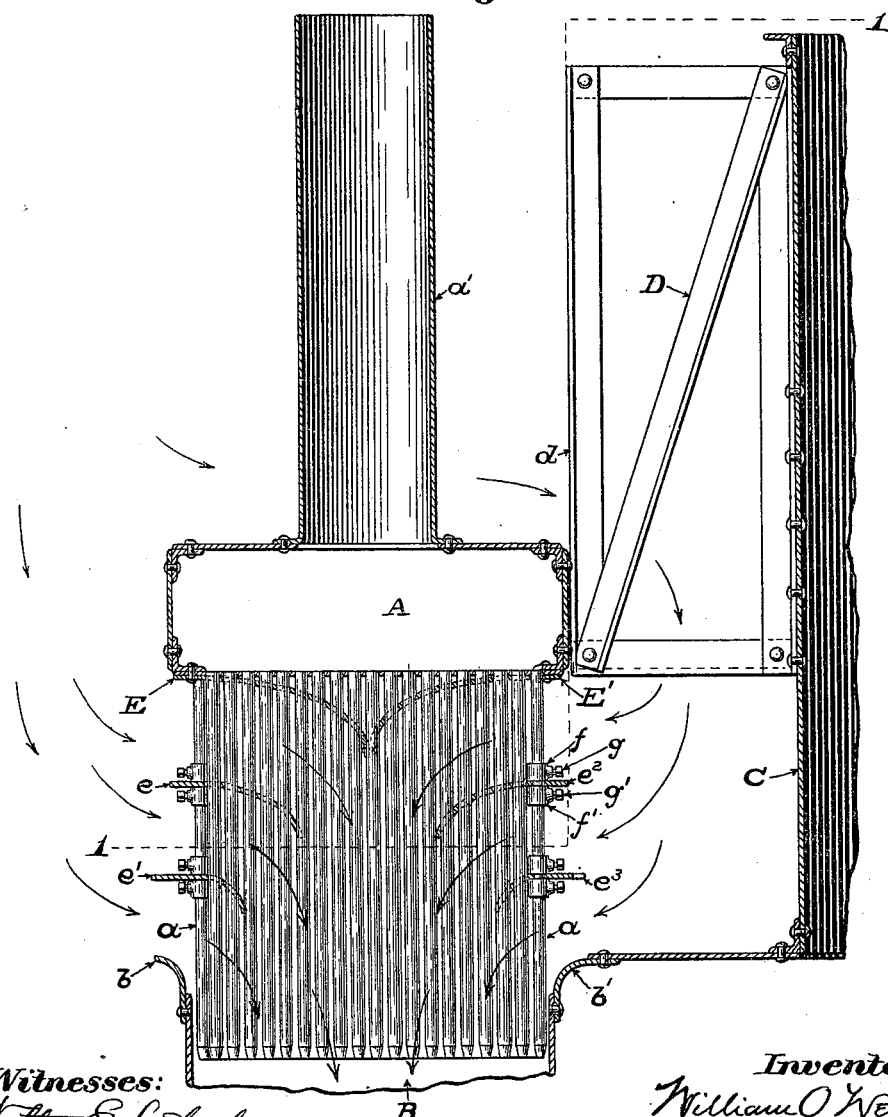
Figure 4:
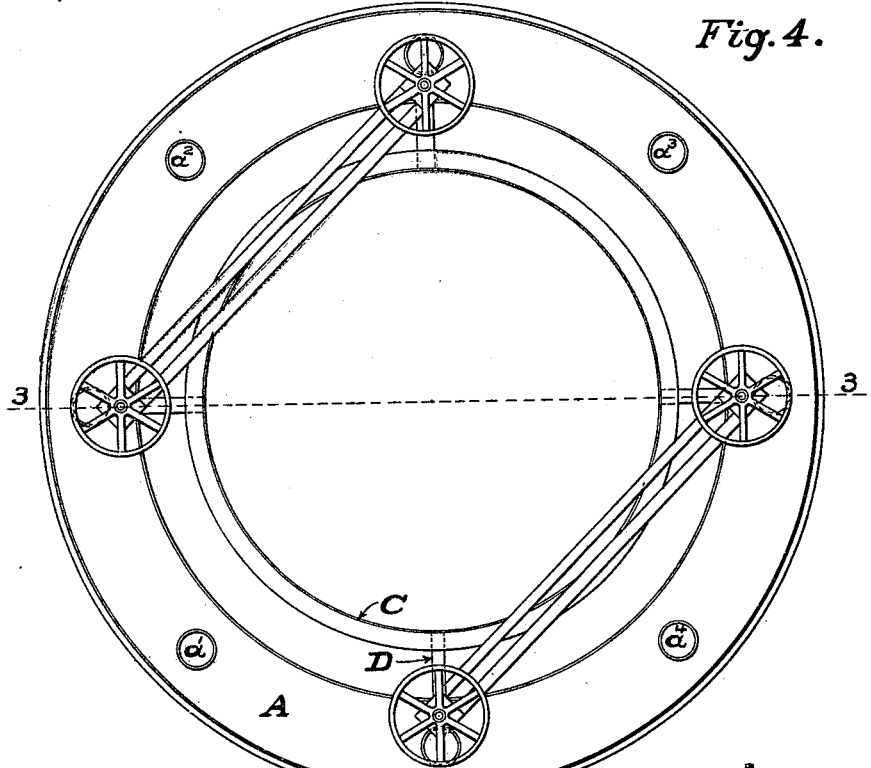
Figure 3:
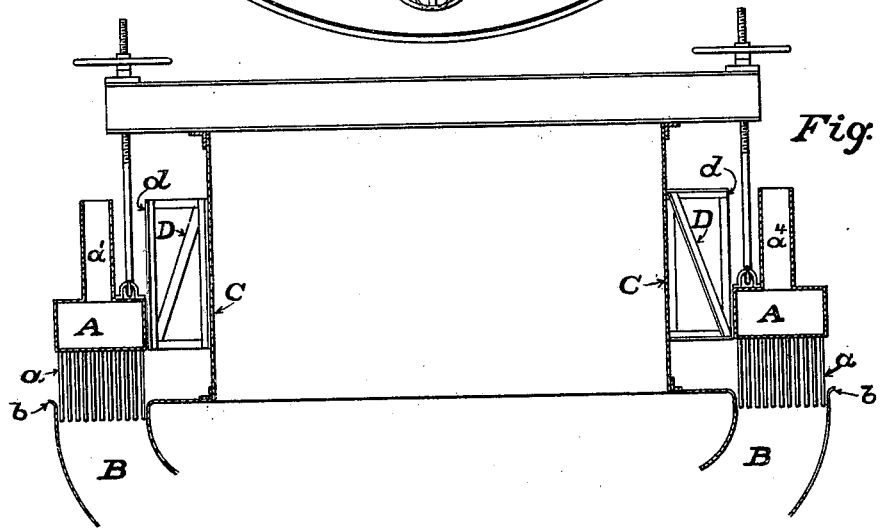

Figure 1 is a part-horizontal plan on the top of the main air-inlet chamber, preferably made in annular form; but I do not wish to confine myself to this form, as it is obvious that a circulinear or polyhedral form would do as well and a part-horizontal section on the line 1 1 of Fig. 2. Fig. 2 is a vertical section on the line 2 2 of Fig. 1. Fig. 3 is a vertical elevation; and Fig. 4 a plan view of the inlet-head, showing a means for elevating the air-inlet chamber and connecting parts.

A is an enlarged main annular air-inlet chamber. $a$ represents the small downward-depending air-outlet pipes, and $a'$ $a^2$ $a^3$, &c., the upward-projecting large inlets admitting air to the chamber A. B is the mouth or entrance to the main annular water-inlet. C is one edge of the main inlet-headpiece framing. D is an angle-iron frame or guide riveted to the main frame C, against whose outer surface $d$ the inner edge of the main inlet-chamber A slides as it is raised and lowered vertically and acts to keep the lower ends of the small depending air-outlet pipes $a$ in proper position and relation to the opening in the main annular water-inlet B. E and E' are curved water-guides riveted fast to the lower edge of the main annular air-inlet chamber A, and $e$, $e'$, $e^2$, and $e^3$ are additional water-inlet guides held in position by rings $f f'$, &c., surrounding one of the small depending air-outlet pipes $a$ and fastened adjustably thereto by set-screws $g$ $g'$, &c. The main annular water-inlet B is provided with curved lips $b$ and $b'$. I have shown all of these parts arranged for an annular form of construction; but I do not wish to confine myself to this form, as it is obvious that a circulinear or polyhedral form would do as well.

The operation and advantages of these improvements are as follows: It has been found by experiment that with a given depth of water in the main inlet-tank above the lips $b$ $b'$ of the water-inlet B a certain amount of projection of the small downward-depending air-outlet pipes $a$ below the horizontal level of the upper edge of these lips $b$ and $b'$ would give the most economical results and that with a less depth of water above the lips $b$ and $b'$ a more efficient result could be obtained by changing the amount that the small downward-depending air-outlet pipes $a$ project below the lips $b$ and $b'$. It is therefore of material benefit to provide an arrangement by which this distance can be varied. It is also shown by experiment that if the water were only admitted from one side of the vertical depending small air-outlet pipes $a$ the pipes nearest the direction from which the water was approaching would do the most work. Thus they would admit the largest proportion of air, owing to the increased velocity of the water through them, and the smaller outlet-pipes farthest away from the direction of the approaching water would do the least work and admit the least amount of air, owing to the decreased velocity of the water through these pipes caused by the friction of the water in passing around those pipes nearest the side from which the water is approaching. Therefore in order to largely increase the efficiency of the whole apparatus the specific arrangement in detail herein shown is employed so as to cause the water to enter the annular main water-inlet opening B from both sides, this result being obtained by submerging an enlarged annular air-inlet chamber A and providing it with vertically-projecting passages $a'$ $a'$ $a^2$, &c., placed at regular intervals around its upper surface, between which the water can flow and pass readily to the inner side of the enlarged annular main air-inlet chamber and so down to the inner edge of the main annular water-inlet B. Also, to further increase the efficiency of the apparatus by obstructing and retarding the flow of water through the outside rows of smaller downward-depending air pipes A, and thus force a larger proportion of the water to pass through and around the small air-outlet pipes farthest from the outside, the horizontal annular guides $e$ and $e'$, with curved inwardly-projecting edges, and similar guides $e^2$ and $e^3$, with outwardly and downwardly curved projecting edges, are properly adjustable vertically above the lips $b$ and $b'$ of the main water-inlet B, so as to cause the proper proportion of water to seek its downward passage through the pipes which are the farthest away from the direction of approach of the water.

While the air-chamber has been illustrated as of a continuous annular character, still it will be obvious that the chamber surrounding the water-passage may be formed of separated sections or subdivided by partitions. The chamber may also be of any desired angular conformation and is not necessarily of an annular or curved outline.

Having fully described and explained this improvement, what I desire to claim and secure by Letters Patent is as follows:

1. In a hydraulic air-compressing apparatus, the combination with a water-passage, of a submerged air-chamber located adjacent thereto and having a substantially-unobstructed upper face, an air-inlet pipe to said chamber of less diameter than the chamber and extending at an angle thereto, to a point above the water-level whereby a free flow of water over said upper surface of the chamber is permitted, and a series of air-outlet pipes discharging into said water-passage, substantially as specified.

2. In a hydraulic air-compressing apparatus, the combination with a water-passage, of a submerged air-chamber located adjacent thereto, an air-inlet pipe to said chamber of less diameter than the chamber, and a series of outlet-pipes extending from said chamber upon opposite sides from said inlet connection therewith and each of less diameter than the inlet, substantially as specified.

3. In a hydraulic air-compressing apparatus, the combination with a water-passage, of a submerged air-chamber located adjacent thereto, air-inlet pipes disposed at opposite sides of the center of said chamber, and a series of air-outlet pipes from said chamber located between the points of connection of said inlet-pipes, substantially as specified.

4. In a hydraulic air-compressing apparatus, the combination with a water-passage, of a continuous air-chamber extending laterally of the same, a series of outlet-pipes extending from said chamber toward said water-passage, and an air-inlet for said chamber, substantially as specified.

5. In a hydraulic air-compressing apparatus, the combination with a water-passage of a continuous air-chamber surrounding the same, a series of outlet-pipes depending from said chamber toward said water-passage, an air-inlet for said chamber, and a central frame provided with means for raising and lowering said chamber and parts carried thereby, substantially as specified.

6. In a hydraulic air-compressing apparatus, the combination with a water-passage, of an air-chamber surrounding the same, a series of outlet-pipes extending from said chamber toward said water-passage, an air-inlet for said chamber, a central frame provided with means for raising and lowering said chamber, and guides between the chamber and frame for determining the horizontal position of the air-outlet pipes relative to the water-passage, substantially as specified.

7. In a hydraulic air-compressing apparatus, an enlarged, submerged air-inlet chamber provided with downwardly-projecting air-outlet pipes on the lower part thereof, said air-outlet pipes being provided with curved guides for the purpose of guiding and regulating the amount of water passing between them, substantially as described.

8. In a hydraulic air-compressing apparatus, an enlarged, submerged air-inlet chamber provided with downwardly-projecting air-outlet pipes on the lower part thereof, said air-outlet pipes being provided with curved guides for the purpose of guiding and regulating the amount of water passing between them, and adjustably connected thereto, substantially as described.

In testimony whereof I have hereunto affixed my signature in the presence of two subscribing witnesses.

WILLIAM O. WEBBER.

Witnesses:
CHESTER S. NORRIS,
AMY F. WILLIAMSON.